United States Patent
Geislinger et al.

(10) Patent No.: US 8,627,931 B2
(45) Date of Patent: Jan. 14, 2014

(54) TORSIONAL VIBRATION DAMPER

(75) Inventors: Cornelius Geislinger, Salzburg (AT); Matthias Geislinger, Salzburg (AT); Stephan Lange, Hallwang (AT)

(73) Assignee: Ellergon Antriebstechnik, Hallwang (AT)

( * ) Notice: Subject to any disclaimer, the term of this patent is extended or adjusted under 35 U.S.C. 154(b) by 211 days.

(21) Appl. No.: 12/868,997

(22) Filed: Aug. 26, 2010

(65) Prior Publication Data

US 2011/0048877 A1 Mar. 3, 2011

(30) Foreign Application Priority Data

Aug. 28, 2009 (DE) .......................... 10 2009 039 039

(51) Int. Cl.
*F16F 15/173* (2006.01)
*F02B 77/00* (2006.01)

(52) U.S. Cl.
USPC ............................ 188/290; 188/378; 74/574.4

(58) Field of Classification Search
USPC ................. 188/290, 293–294, 378; 74/574.4, 74/573.1, 573.11
See application file for complete search history.

(56) References Cited

U.S. PATENT DOCUMENTS

| | | | | |
|---|---|---|---|---|
| 3,211,396 A | * | 10/1965 | McQuillen | 242/156.2 |
| 3,555,926 A | * | 1/1971 | Moorhouse et al. | 74/573.1 |
| 3,641,839 A | * | 2/1972 | Greeley | 74/573.1 |
| 4,215,772 A | * | 8/1980 | Graham | 193/35 A |
| 4,660,436 A | * | 4/1987 | Davoust et al. | 74/573.13 |
| 4,702,438 A | * | 10/1987 | Levy et al. | 244/104 FP |
| 4,723,639 A | * | 2/1988 | Hungerford | 188/307 |
| 5,058,453 A | * | 10/1991 | Graham et al. | 74/573.11 |
| 5,862,897 A | * | 1/1999 | Allport et al. | 188/378 |
| 5,996,748 A | * | 12/1999 | Nezu et al. | 188/313 |
| 2006/0261530 A1 | * | 11/2006 | Stamps et al. | 267/140.11 |

FOREIGN PATENT DOCUMENTS

| | | |
|---|---|---|
| DE | 2005080 A1 | 8/1970 |
| DE | 19855419 B4 | 6/2000 |
| GB | 1305398 A | 1/1973 |
| GB | 2344399 A | 6/2000 |
| JP | 2007315416 A * | 12/2007 |

* cited by examiner

*Primary Examiner* — Anna Momper
(74) *Attorney, Agent, or Firm* — Myers Wolin, LLC

(57) ABSTRACT

A torsional vibration damper comprises a housing with a fluid-tight ring-shaped chamber and a vibration ring, which is rotatably supported in the ring-shaped chamber of the housing. Between the vibration ring and the housing, a gap-shaped oil receiving space is formed, which is filled with a viscous damping fluid The oil receiving space has an oil outflow and an oil inflow. The oil drain communicates with a section of the oil receiving space located radially further outside than the oil inflow. The replacement of the damping fluid present in the oil receiving space is thus controlled. This makes it possible to refresh the damping fluid over an operation interval, so that the defined damping properties are maintained during the entire operation period. This helps to increase the life of a torsional rotary damper that is autonomous with reference to the oil supply, or to lengthen maintenance intervals.

19 Claims, 6 Drawing Sheets

TORSIONAL VIBRATION DAMPER

CROSS REFERENCE TO RELATED APPLICATIONS

This application claims priority under 35 USC §119 to German Patent Application No. 10 2009 039 039.1 filed on Aug. 28, 2009, the contents of which are incorporated herein by reference.

FIELD OF THE INVENTION

The present invention relates to a torsional vibration damper having a housing comprising a fluid-tight, ring-shaped chamber, as well as a vibration ring that is rotatably supported in the ring-shaped chamber, wherein a gap-shaped oil receiving space filled with a viscous damping fluid is formed between the vibration damper ring and the housing.

With a torsional vibration excitation of the damper, the damping fluid in the gap-shaped oil receiving space between the housing and the vibration ring is subjected to shearing stress. Thereby, vibration energy is drawn from a vibrating system and converted into heat energy, resulting in the desired damping effect.

BACKGROUND OF THE INVENTION

Such dampers have been known for a long time. The range of sizes extends from the smallest dampers with diameters of less than 100 mm for automobile engines and camshafts to dampers for commercial vehicle engines of all power classes, to dampers with diameters of more than 2000 mm for large engines like ship propulsion main drives. A damper of the type described above is, for example, described in DE 198 55 419 B4.

Generally, highly viscous silicon oils are used as damping fluids. The shearing of the damping fluid and the concomitant heat generation over the period of use of the damper, leads to wear of the silicon oil especially due to the breaking up of long-chained oil molecules. This changes the damping properties of the damper until, from a certain limit onwards, the damper is not suitable any more to effect adequate damping.

This oil wear is irreversible and results in a limited life of such dampers. Through the use of chemical oil additives, the wear behavior can be improved, though not stopped.

It is therefore necessary to monitor the wear state of the oil by regular sampling and oil analysis by the damper manufacturer, if the life of the damper is shorter than that of the damped drive. As soon as the oil state exceeds a wear limit, the damper is replaced or supplied with new oil on-site.

If the dampers involved are not throw-away dampers, they are generally re-generated and prepared. This involves opening and cleaning the damper, the exchange of bearing elements, as well as the re-assembly and replenishment with oil. The bigger the damper, the more costly and involved this process becomes. With large dampers of the kind used for ship drives, dismantling, transport and reinstallation involve high costs, which can be more than the value of the damper. In addition, the plants have to be at standstill, as they cannot be operated without dampers.

It is possible to replenish the oil in the installed state of the damper by pressing fresh oil from the outside through openings in the housing into the inside and forcing out used oil through other openings to the outside. However, the disadvantage of this procedure is that the exact filling of the damper is difficult. But such accuracy is required, since the damper must contain neither too little nor too much oil for providing the desired damping. Moreover, it is not possible to rinse out all the used oil in this manner, so that ultimately, an undefined mixture of new and used oil is generated. A certain extension of the life of the damper is possible that way. However, the condition that is achieved with such a refilling is not equivalent to that of a completely cleaned and freshly filled damper.

SUMMARY

Given this background, the goal of the invention was to increase the maintenance interval of a torsional vibration damper or to lengthen its life.

The torsional vibration damper according to the invention comprises a housing having a fluid-tight ring-shaped chamber and a vibration ring, which is rotatably supported in the ring-shaped chamber of the housing, wherein a gap-shaped oil receiving space filled with a viscous damping fluid is formed between the vibration damper ring and the housing. It is distinguished by the fact that the oil receiving space has an oil inflow and an oil outflow, the oil outflow communicating with a section of the oil receiving space that is located radially further outside than the oil inflow, to control the replacement of the oil that is in the oil receiving space.

Through a controlled internal oil exchange in the damper, the life of a torsional vibration damper, which is autonomous with reference to the oil supply, is increased. The period until the oil in the damper is worn gets extended. This results in longer maintenance intervals.

Such an oil exchange is not possible in a traditional damper, such as the one described in DE 198 55 419 B4. This latter damper does have an expansion space radially on the inside. However, the function of this expansion space is solely to compensate for tolerances in the filling of the damper as well as the different heat elongation of the damping fluid and the housing. During filling, high-viscosity oil is generally filled in at high pressure to shorten the filling time. Under such circumstances, it is difficult to exactly set the filled quantity, so that any filling tolerances have to be compensated for by the expansion space. Experiments have shown that the oil in the expansion space does not get exchanged with the oil in the actual working gap. Rather, the oil which is once filled in, by and large remains where it has flown while filling. As against that, in the solution according to the invention, a slow flow movement of the damping fluid through the oil receiving space from the inside to the outside is achieved. In other words, during use of the damper automatic exchange of the oil in the oil receiving space is obtained and controlled.

In particular, the internal oil exchange in the damper can be controlled in different ways.

According to a first advantageous embodiment, one or more throttle openings are provided on the oil outflow, which communicates with the oil receiving space. Here, the circumstance is exploited, that due to the rotation of the damper during operation, a fluid pressure is built up in the damping fluid, which increases from the inside to the outside. Under the described pressure, the damping fluid slowly flows through the throttle opening or openings. Damping fluid, which is slowly being destroyed in the shearing gap through the shearing stress, flows out through these openings. This results in a long-term, slow and automatic replacement of the damping fluid.

Preferably, the throttle opening or openings connect to a zone of the oil receiving space that is located radially outside the outer periphery of the vibration ring. This helps to ensure that the most stressed oil is always drained first.

According to another advantageous embodiment, the throttle opening or throttle openings can have a valve function, so that the desired replacement of the oil only takes place under specific conditions. For example, the valve function can be so designed that the throttle opening or openings open only, when a predetermined pressure level is reached, but remain closed below that level. In this manner, it is possible to match the life of the damper to its actual method of operation. Generally, damping is not required at low rotational speeds. The oil is not stressed, so that the throttle opening or openings can remain closed. At higher rotational speeds, the damper becomes active, so that the oil wears. In this condition, by opening the throttle openings, a slower oil replacement becomes possible.

In a special embodiment variant, the pressure level for the throttle opening or openings to open is set so high that it is above the maximum operating pressure. In addition, a storage chamber for damping fluid or the oil receiving space has a closable inflow pipe opening. In this embodiment variant, the throttle opening or openings do not open during operation, but only upon application of a higher pressure, at which point the worn oil is pressed out of the oil receiving space.

According to another advantageous embodiment, the valve function is temperature-dependent, since oil wears to a greater extent at higher temperatures. The throttle opening or openings in this case do not open until a predetermined temperature level is reached, but remain closed below that level.

Moreover, a rotational speed-dependent valve function can be accomplished, for example, by means of centrifugal force plates. The throttle opening or openings do not open until a predetermined rotational speed is reached, but remain closed below that value.

According to another advantageous embodiment, the damper comprises a closing device that can be controlled from outside the damper, for opening and closing the throttle opening or openings. That way, the internal oil exchange can be controlled from the outside.

In a simple embodiment variant, the damper is operated for an initial operating time with the throttle opening closed. Next, the closing device is opened, so that the oil in the oil receiving space can be replaced. Opening can be achieved, for example, by manually actuating the closing device. In this manner, the damper is available for a second operating time without it having to be dismantled or filled with fresh oil.

According to yet another advantageous embodiment, the throttle opening or openings is or are formed by a filtration device, which is permeable for media up to a defined viscosity limit. This allows a requirement-conformant oil replacement with optimum oil utilization. With wear, the viscosity of the oil decreases. Worn, low-viscous oil exits the oil receiving space through the filtration device, whereas high-viscosity oil continues to remain in the oil receiving space.

The oil outflow and the oil inflow can be realized through a storage chamber for damping fluid and an oil collection chamber, which can be housed at the damper in the manner that is described further below. In general, here, the storage chamber is connected with a radially inner section of the oil receiving space whereas the oil collection chamber is connected via the throttle opening(s) with a section of the oil receiving space, located radially further outside, to make possible an automatic oil replacement without the use of special conveying devices. In the oil collection chamber, used damping fluid from the damper is collected and fresh damping fluid from the storage chamber is replaced in the damper. The speed at which the oil replacement takes place can be regulated by the overflow cross-section of the throttle openings.

Preferably, the storage chamber is arranged on a smaller radius than the gap-shaped oil receiving space, for example, radially inward from the vibration ring. If a quantity of damping fluid that is X times greater than the total oil receiving space volume is stored in the storage chamber, and the leakage or flow speed through the throttle openings is matched correspondingly, an X times longer life of the damper can be achieved without it having to be maintained in the intervening period.

In order to avoid under-filling of the oil receiving space, the oil collection chamber preferably has a smaller or—at the most—approximately the same volume as the storage chamber. Thus, the shearing gap cannot get emptied. As soon as the oil collection chamber is completely filled with used damping fluid, a pressure equal to that in the shearing gap is formed in the damping fluid and the damping fluid stops flowing through the throttle openings.

If the collection tank is full, the damping fluid in the oil receiving space is not replaced any more. This can be recognized from a suitable level indication or level sensing system and reported to the operating agency of the plant. However, instead of dismantling, cleaning, re-installing and re-filling the damper, as is the case with traditional dampers, in the case of the damper according to the invention, it is enough to empty the oil collection chamber and close it again, and thereafter, to fill the storage chamber with the same quantity of fresh oil. The handling effort and cost involved with this procedure is far smaller than with traditional dampers.

As soon as the damper rotates again, the replacement process of the damping fluid starts afresh and it is ensured that in the shearing gap or in the gap-shaped oil receiving space there is always damping fluid of adequate quality present. Such an emptying of the exchange tank as well as the refilling of the damping fluid storage tank can be carried out without taking down the damper from the shaft. In particular, in the case of large dampers on ships, this is a great advantage in terms of time and cost.

At present, the inner bearing elements of the damper are replaced at every overhaul for reasons of safety, since they are not a major cost factor. However, in the case of a damper according to the invention, upon emptying the exchange tank and refilling the damping fluid storage tank, dismantling and opening of the damper are not required. According to another advantageous embodiment of the invention, therefore, the bearing of the vibration ring at the housing has a stronger design for several damping fluid pass intervals.

According to an advantageous embodiment of the invention, the oil collection chamber is formed radially outside the ring-shaped chamber in the housing and separated from the ring-shaped chamber by a crosspiece. The one or more throttle openings, which connect the oil collection chamber to the ring-shaped chamber, are preferably placed in this crosspiece. The ring-shaped chamber and the oil collection chamber can thus be manufactured particularly easily, for example, in a housing base body.

However, it is also possible to separate the oil collection chamber through the use of the ring-shaped chamber. The latter is inserted in the ring-shaped chamber and can be formed as a simple separating ring or a separate collection tank. The throttle openings that join the oil collection chamber with the ring-shaped chamber are located in this case in the insert, by preference.

According to another advantageous embodiment of the invention, the oil collection chamber can be formed in a collection tank that is externally fastened to the housing, with the tank being connected through one or more throttle openings with the oil receiving space in the ring-shaped chamber. If the collection tank is full, it can thus be detached rather easily and replaced by an empty tank. It is, however, also possible to leave the collection tank on the damper during emptying.

According to another advantageous embodiment, the oil collection chamber is arranged in the vibration ring in a particularly space-saving manner.

In a similar manner, the storage chamber can be arranged within the damper, in the vibration ring, or on an outer side of the housing.

Preferably, the storage chamber radially inward borders on the ring-shaped chamber, so that fresh oil is always completely forced through the oil receiving space and there are no dead zones created.

According to another advantageous embodiment of the invention, the oil replacement can also be achieved through a forced circulation; here, too, the oil quantity in the damper is greater than the volume in the oil receiving space. According to the invention, in the case of this variant, the oil outflow and the oil inflow of the oil receiving space are connected to one another by a bypass pipe that bridges the oil receiving spaces. There is a circulating pump arranged in the bypass pipe, so that the oil gets worn uniformly during operation. In the case of a quantity of damping fluid that is bigger as compared to the volume of the oil receiving space by a factor of X, a life that is X times longer as compared to traditional dampers of the same type is obtained.

BRIEF DESCRIPTION OF THE FIGURES

The following detailed description of the present invention will be given with the help of the exemplary embodiments shown in the accompanying drawing. The drawing shows, in.

DETAILED DESCRIPTION

Figure 1:
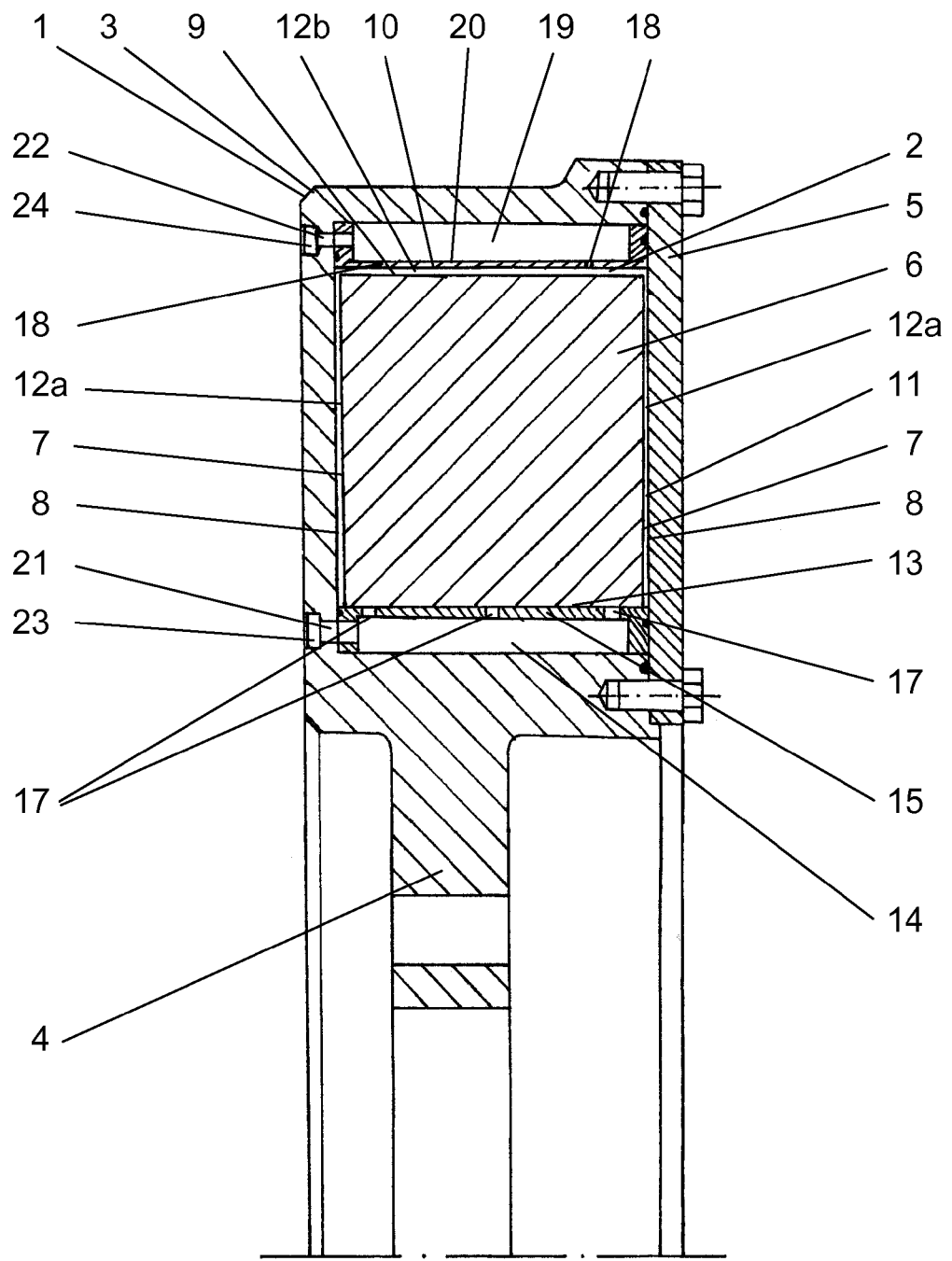
FIG. 1 shows a half-section of a first exemplary embodiment of a torsional vibration damper according to the invention.

The first exemplary embodiment in FIG. 1 shows a torsional vibration damper, such as is used, for example, on a crankshaft of a marine engine. The torsional vibration damper comprises a housing 1, in which a ring-shaped chamber 2 is formed. In the exemplary embodiment of FIG. 1, the ring-shaped chamber 2 is formed in a housing base body 3, which further has a flange section 4 for coupling to a shaft. The ring-shaped chamber 2 is closed fluid-tight on an axial end face by a housing cover 5.

The torsional vibration damper further comprises a vibration ring 6, which is supported rotatably in the ring-shaped chamber 2 of the housing 1. Between the axial end faces 7 of the vibration ring 6 and on the opposite inner walls 8 of the housing 1 as well as between a radial outer periphery 9 of the vibration ring and a radial inner periphery 10 of the housing 1, a gap-shaped oil receiving space 11 is formed with two axial gaps 12a and a radial gap 12b. In the case of vibration rings with different profiles, another gap arrangement may result. For example, the vibration ring may have a C- or L-shaped profile. Furthermore, the vibration ring 6 is supported around its radial inner periphery 13 on the housing 1 by means of a friction bearing, and is axially guided e.g. by means of starting plugs, Teflon foil or the like.

The oil receiving space 11 in the ring-shaped chamber 2, i.e. the gaps 12a and 12b are filled with a viscous damping fluid, preferably a highly viscous silicon oil. When there is a torsional vibration excitation of the housing 1, there is a relative rotation between the housing 1 and the vibration ring 6, so that the damping fluid present in the gaps 12a and 12b is subjected to shearing stress, which results in a damping effect. The oil receiving space 11 is tapered or stepped in the radial direction, to keep the shearing angle in the oil essentially constant.

The damper further comprises a storage chamber 14 for storing damping fluid, the storage chamber 14 being connected to the ring-shaped chamber 2. In the exemplary embodiment shown, the storage chamber 14 is separated within the housing 1 by an inner ring 15 from the ring-shaped chamber 2. The inner ring 15, which represents a part of the housing 1, is inserted in the housing base body 3 from the side of the housing cover 5 and has a plurality of overflow channels 17, which allow overflow of damping fluid from the storage chamber 14 into the ring-shaped chamber 2 or a radially inner section of the gap-shaped oil receiving space 11.

Moreover, the housing 1 of the damper has one or more throttle openings 18 for controlling the oil replacement in the gap-shaped oil receiving space 11. In the case of the first exemplary embodiment shown, the oil replacement takes place through the throttle openings 18 according to the principle of a defined leak. The cross-sections of the throttle openings 18 should be so dimensioned that damping fluid is discharged very slowly during the operation of the damper from the gap-shaped oil receiving space 11. The throttle openings 18 communicate with a radially external section of the gap-shaped oil receiving space 11 in the ring-shaped chamber 2. The most intensely stressed fraction of the damping fluid is led off through it. The outflow is caused by the increasing fluid pressure from the inside to the outside. Out flowing damping fluid is automatically replaced by damping fluid from the storage chamber 14. This results in a long-term, automatic and impurity-free replacement of the damping fluid over an operating duration interval of the damper.

The damper fluid flowing out of the ring-shaped chamber 2 is collected in an oil collection chamber 19. In the first exemplary embodiment, the oil collection chamber 19 is arranged inside the housing base body 3. However, it is also possible to attach a collection tank with an oil collection chamber on the external side of the housing base body 3 or to locate it in the vibration ring 6. In all cases, the throttle openings 18 open into the oil collection chamber 19.

For guaranteeing the correct replacement process of the damping fluid as explained above, the oil collection chamber 19 has approximately the same volume as the storage chamber 14. If the collection tank 14 is completely filled with used oil, the replacement process is automatically stopped, since oil cannot continue to flow. This prevents the oil receiving space 11 from emptying itself in the ring-shaped chamber 2 of the damper. In order to achieve an optimum throughput of the damper fluid, it is of advantage to connect the throttle openings 18 to a section of the ring-shaped chamber 2 located between the outer periphery 9 of the vibration ring 6 and the inner periphery 10 of the housing 1, i.e. in the area of the gap 12b.

In the exemplary embodiment shown, the oil collection chamber 19 is separated by an outer ring 20 from the ring-shaped chamber 2. With the housing cover 5 removed, the outer ring 20 is inserted in the housing base body 3. In the present case, it forms the inner periphery 10 of the housing and comprises the throttle openings 18. As a result, the oil collection chamber 19 is fluid-tight to the external surroundings.

However, the oil collection chamber 19 can also be implemented and arranged in a different manner, as long as the replacement process for the damping fluid as described above is guaranteed.

If the damping fluid stock in the storage chamber 14 is used up, it can be refilled without opening the ring-shaped chamber 2. Exhaustion of the damping fluid can, for example, be recognized by means of a level indication on the oil collection chamber 19. In case of a refilling of the storage chamber 14, the oil collection chamber 19 is simultaneously emptied. This, too, is possible without opening the ring-shaped chamber 2. To do so, suitable inflow and outflow channels 21 and 22 may be provided on the housing 1 or on the housing base body 3, which are closed during operation by stopper plugs 23 and 24.

Figure 2:
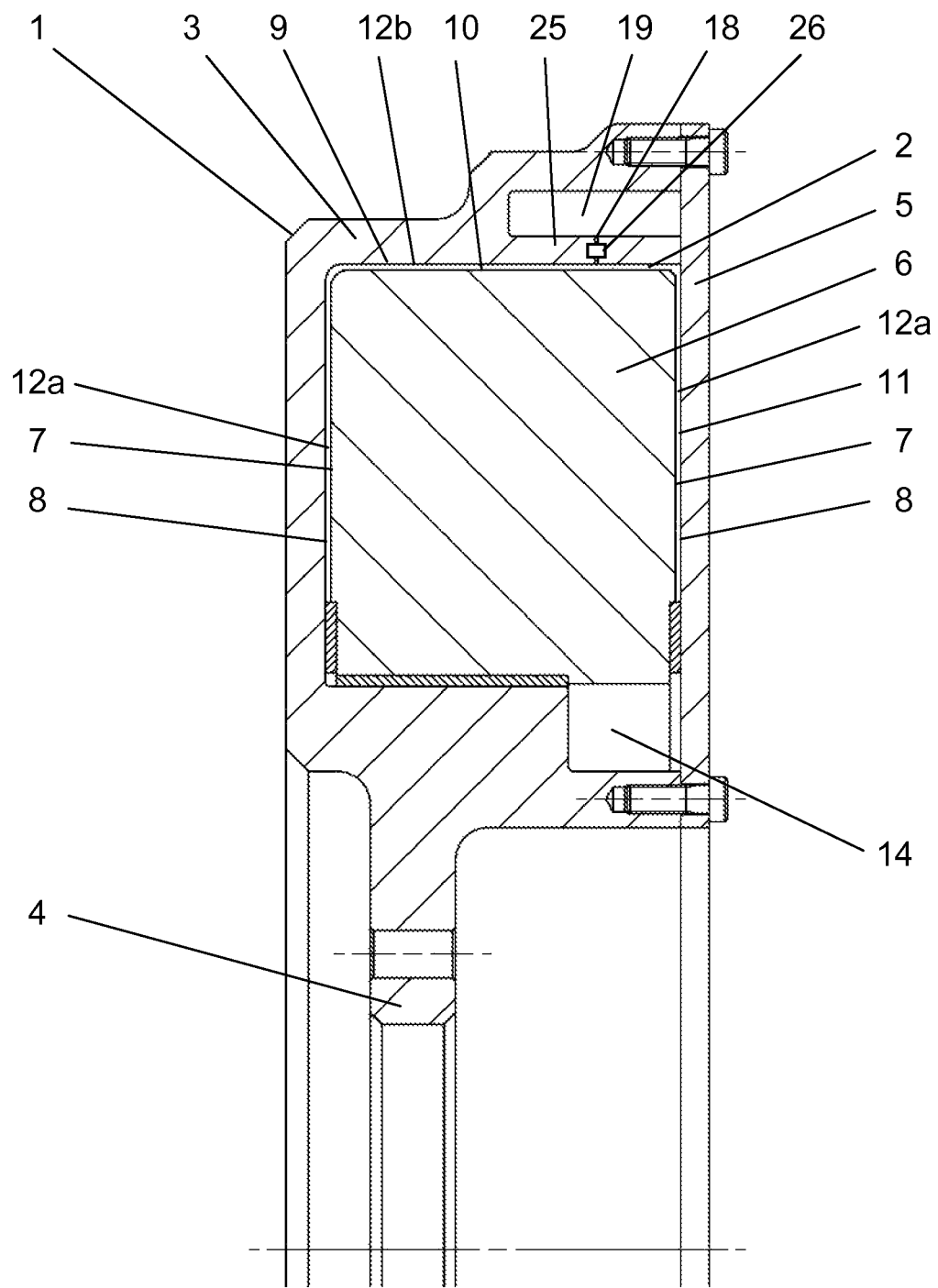
FIG. 2, shows a half-section of a second exemplary embodiment of a torsional vibration damper according to the invention.

FIG. 2 shows a second exemplary embodiment, which, in reference to housing 1, represents a technical simplification of the first exemplary embodiment. Similar components are correspondingly marked with the same reference numerals. In contrast to the first exemplary embodiment, the oil collection chamber 19 of the second exemplary embodiment is separated from the ring-shaped chamber 2 not by an insert, but by a crosspiece formed integrally with the housing base body 3. The oil collection chamber 19 is arranged radially outside the ring-shaped chamber 2, with a throttle opening 18 that is formed in the crosspiece 25 joining the oil collection chamber 19 to the oil receiving space 11 of the ring-shaped chamber 2.

The storage chamber 14 of the second exemplary embodiment is formed by a radially inward-directed expansion of the ring-shaped chamber 2, which is connected with the gap-shaped oil receiving space 11. The latter thus has an oil inflow and an oil outflow, with the oil outflow communicating with a section of the oil receiving space 11 located radially further outside than the oil inflow. The replacement of the damping fluid in the oil receiving space 11 is controlled by the outflow through the throttle openings 18; there may also be more throttle openings 18 than the one shown here. Oil escaping into the oil collection chamber 19 is replaced from the storage chamber 14.

The throttle openings 18 can be implemented as simple leakage bores as in FIG. 1. FIG. 2, however, shows an example of a valve-controlled variant, which makes possible the replacement of the damping fluid depending on the operation of the damper, because with increasing pressure, increasing temperature and increasing rotational speed, the wear of the oil increases. To do so, on the throttle opening 18 there is a valve 26, which opens and closes pressure-dependently and/or time-dependently and/or temperature-dependently and/or rotational speed-dependently.

In the present case, the valve 26 has been deployed in such a way that the throttle opening 18 will not open until a predetermined pressure is reached, but will remain closed below, as the wear of the oil increases with increasing temperature. In the case of a temperature-dependent valve function, the throttle opening 18 will not open until a predetermined temperature level is reached, but will remain closed below. In the case of a rotational speed-dependent valve function, the throttle opening will not open until a predetermined rotational speed is reached. In the case of a time-dependent valve function, the throttle opening will not open until a certain operating time is reached.

The valve 26 shown in FIG. 2 opens and closes automatically depending on pressure, time, temperature and/or rotational speed. However, it may also be implemented as a closing device for opening and closing the throttle opening that is controlled from outside the damper 1, and which can be actuated either manually or by power operation.

Figure 3:
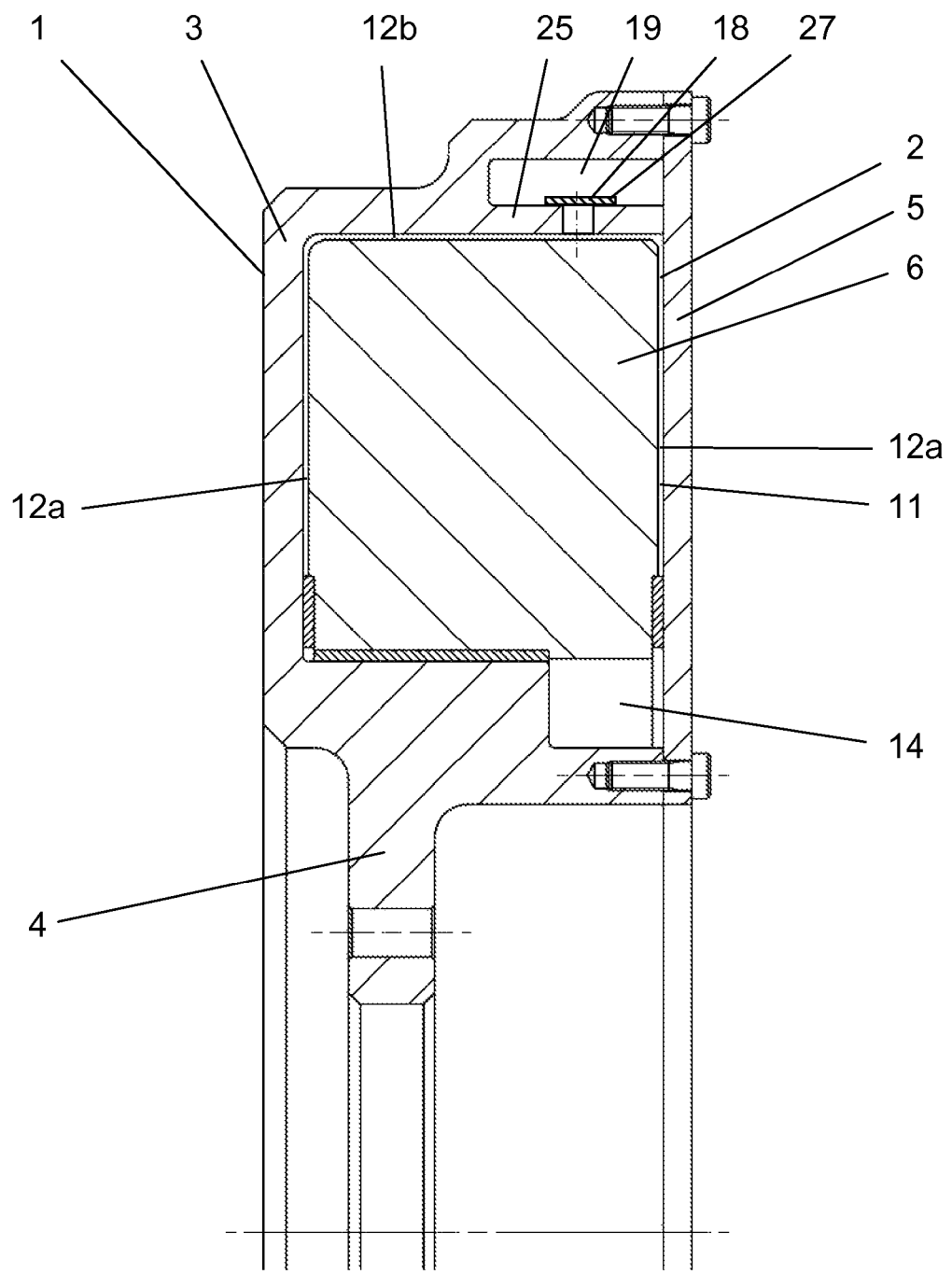
FIG. 3, shows a half-section of a variant of the second exemplary embodiment.

FIG. 3 shows another modification, in which the throttle openings 18 are formed by a filtration device 27, which is permeable for damping fluids up to a predetermined viscosity limit. The filtration device 27 may, for example, be formed as a membrane, which is permeable for viscosities that occur with worn oil, but blocks oil with higher viscosities.

Figure 4:
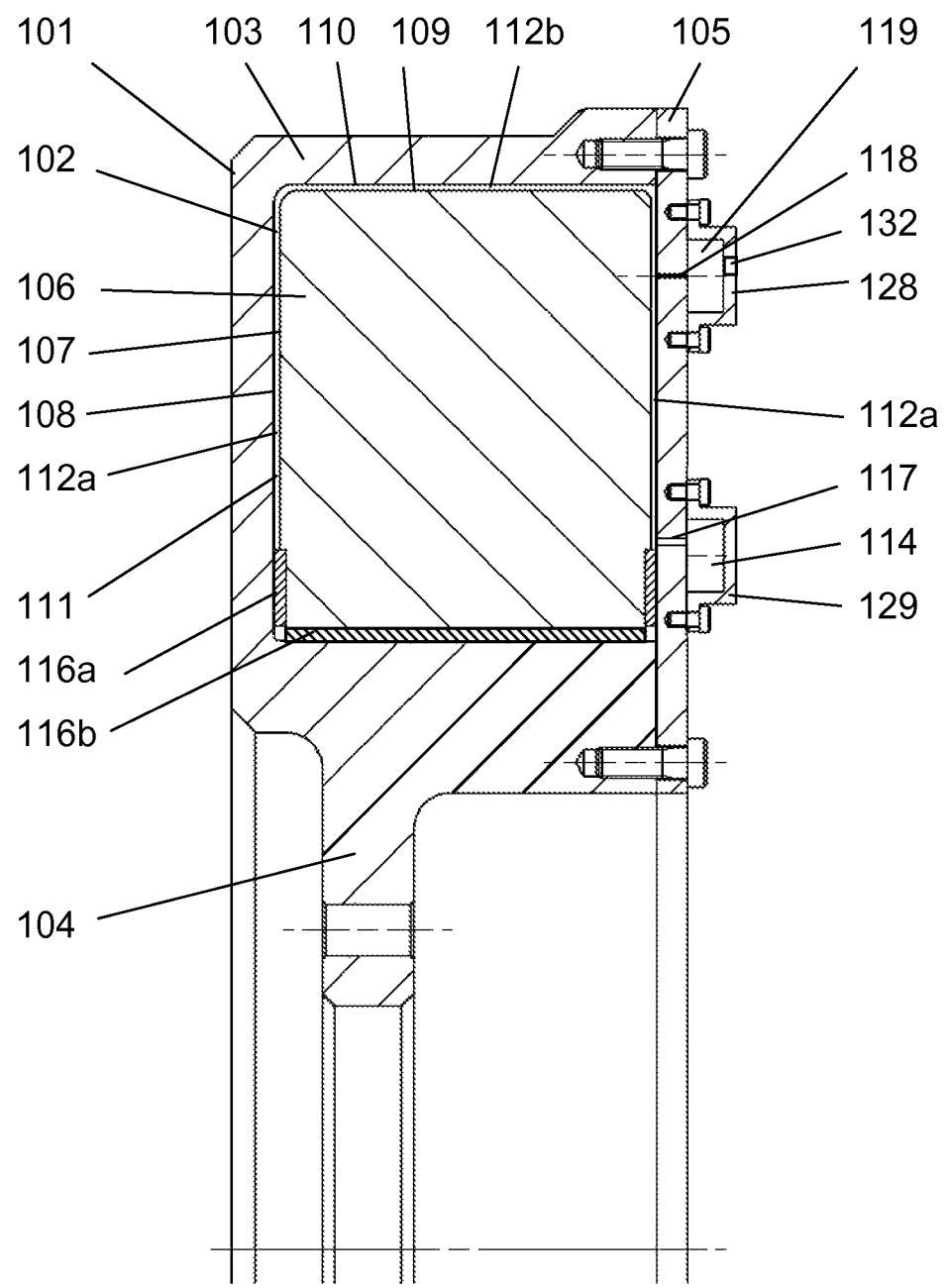
FIG. 4, shows a half-section of a third exemplary embodiment of a torsional vibration damper according to the invention.

FIG. 4 shows a third exemplary embodiment for a rotational vibration damper 1. It comprises a housing 101 with a ring-shaped chamber 102. The housing 101 has a housing base body 103, in which the ring-shaped chamber 102 is formed, as well as a housing cover 105, which axially closes the ring-shaped chamber 102. Moreover, on the housing 101, there is a flange section 104 for coupling to a shaft. In the ring-shaped chamber 102, a vibration ring 106 is arranged such that it can be rotated with respect to the housing 101. Between the axial end faces 107 of the vibration ring 106 and the opposite inner walls 108 of the housing 1 as well as between a radial outer periphery 109 of the vibration ring and a radial inner periphery 110 of the housing 101, a gap-shaped oil receiving space 111 is each formed with two axial gaps 112a and a radial gap 112b, which is filled with a high-viscosity damping fluid. Furthermore, there are sliding bearing elements 116a and 116b provided on the housing 101, which are made of PTFE, Polyamide or similar resistant materials, by means of which the vibration ring 106 is supported on sliding bearings axially and radially on the housing 1 in a manner similar to the second exemplary embodiment.

For the internal exchange of the oil present in the oil receiving space 111, an oil inflow that is located radially further inward, and an oil outflow that is located further outward are provided, one or more throttle openings 118 being arranged in the oil outflow for controlling the oil replacement in the oil receiving space 111. Here, the throttle openings 118 may be implemented as simple leak bores or as valve-controlled throttle openings as explained above.

The throttle openings 118 lead into an oil collection chamber 119, which is formed on a collection tank 128 that is fixed externally on the housing 101. The present collection tank 128 is fastened to an axial outer wall of the housing cover 105, with the throttle openings 118 extending through it. However, it may also be fastened on the opposite outer wall of the housing base body 103 or on its outer periphery. After the initial assembly or maintenance, the collection tank 128 is initially empty. It fills up during the operation period with used damper fluid. For emptying, the collection tank 128 can be taken off. Alternatively, there may be an oil drain opening provided on the collection tank 128.

The out flowing oil is continuously replaced by oil from a storage chamber 114. This storage chamber may be implemented basically as in the first or second exemplary embodiment or may be implemented as in the fourth exemplary embodiment explained further below. However, in the present case—analog to the collection tank—a storage tank 129 with a storage chamber 114 is shown, which is externally fastened to the housing 101 and is connected to the oil receiving space 111 through a channel 117 that extends through the housing 101.

Figure 5:
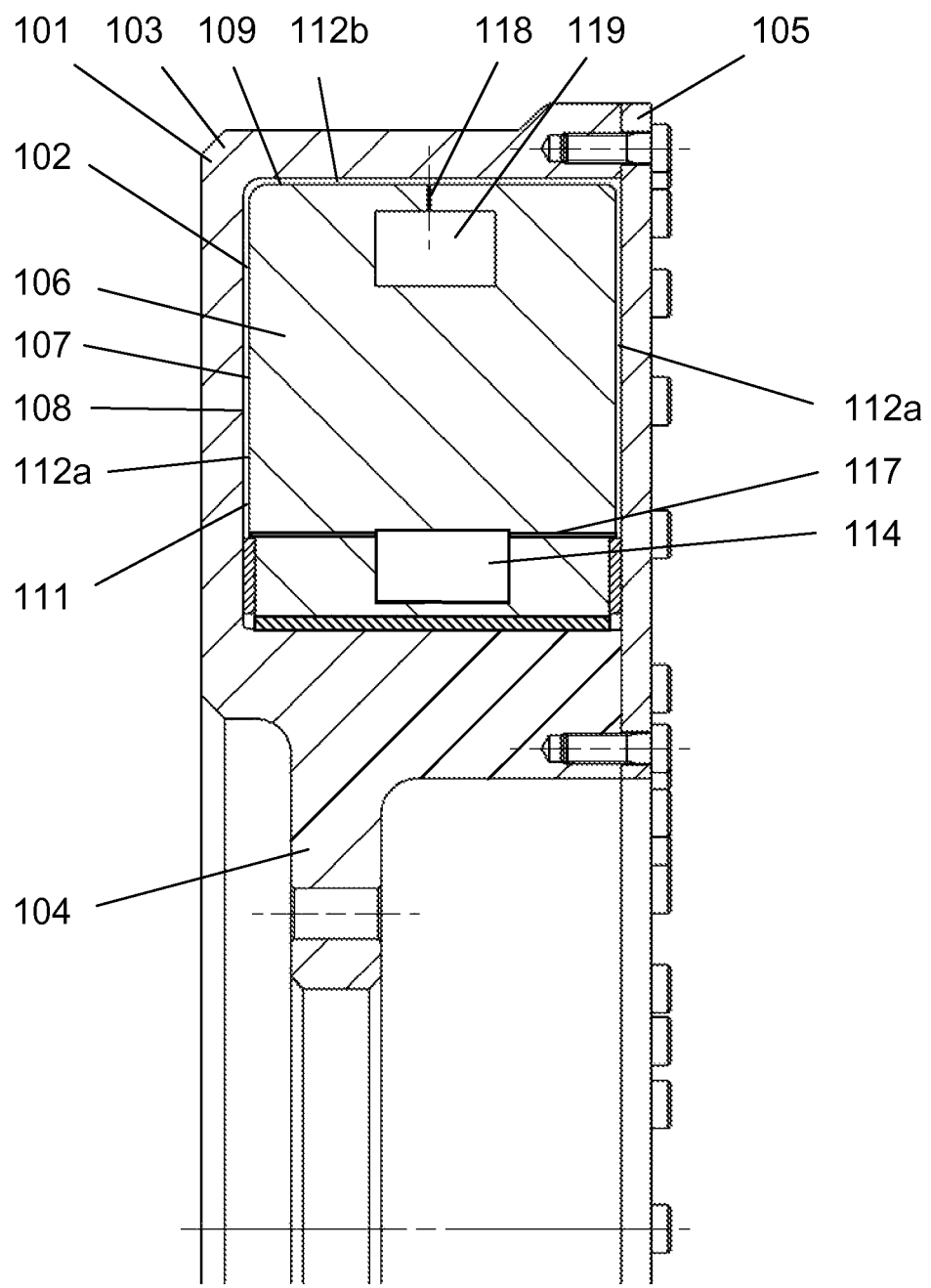
FIG. 5, shows a half-section of a fourth exemplary embodiment of a torsional vibration damper according to the invention.

The storage chamber 114 and the oil collection chamber 119 may also be integrated in the vibration ring 106, as has been shown in FIG. 5 for a fourth exemplary embodiment. Simple or valve-controlled throttle openings 118 are formed in this case in wall sections of the vibration ring 106 and connect a radially externally located section of the oil receiving space 111 with the oil collection chamber 119. For simplifying the manufacture of the oil collection chamber 119 and the storage chamber 114, the vibration ring 106 can be axially divided.

The dampers explained above, whose attributes in reference to the arrangement of the storage chamber and the oil collection chamber as well as in reference to the design of the throttle openings can also be combined differently to what has been shown, make refreshing of the damping fluid over an operation interval of the damper possible, so that defined damping properties are ensured across the entire operation period. Through the throttle openings, in particular, a slow, continuous replacement of the damping fluid is possible. In addition, if valve-controlled throttle openings are used, the replacement of the damping fluid can take place depending on its load.

Through a purposeful guidance of the damping fluid within the oil receiving space, the most heavily loaded fraction of the damping fluid is always drawn out. This avoids undefined mixed states of old and new damping fluid.

If the damping fluid stock is used up, the used damping fluid can be removed without great effort or cost right at the site of the damper, and in a similar manner, the damping fluid stock can be replenished. There is no tedious dismantling or opening of the damper required.

Since the bearing of the vibration ring at the housing is designed for several passes of the damping fluid, there is a significant increase in life as compared to dampers without a continuous replacement process, or a considerable extension of the period between two complete dismantling procedures of the damper.

Figure 6:
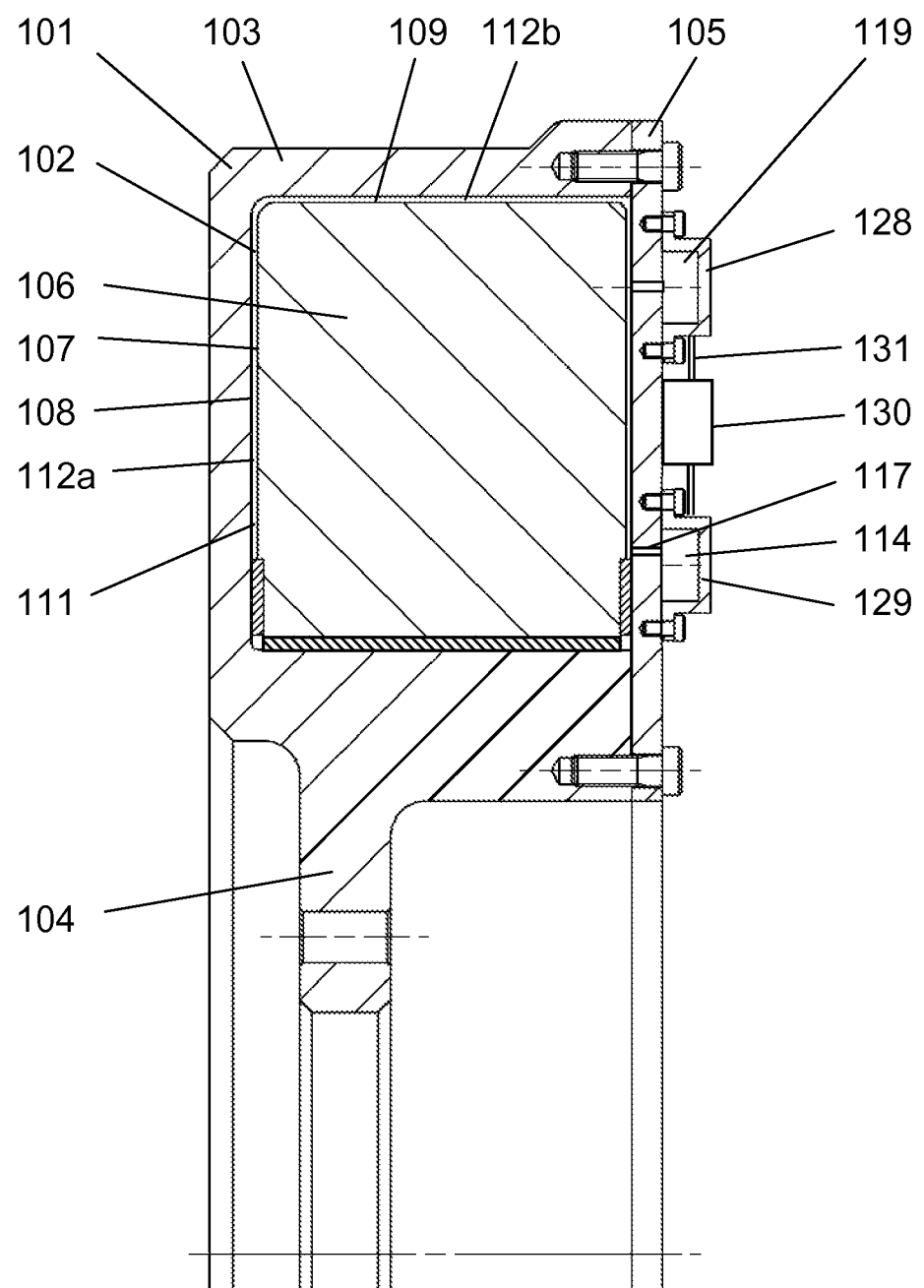
FIG. 6, shows a half-section of a fifth exemplary embodiment of a torsional vibration damper with circulating pump according to the invention.

A fifth exemplary embodiment is shown in FIG. 6. In reference to the housing 101 and the vibration ring 106, it approximately corresponds to the third exemplary embodiment, so that for the corresponding components, the same reference numerals are used and subsequently only the differences are explained in the following. Control of the oil replacement in the oil receiving space 111 in this case does not take place passively but is effected by means of a circulating pump 130, which is merely indicated schematically here. For this purpose, an oil inflow located radially further inward and an oil outflow located radially further outward are connected to one another by a bypass pipe 131 that bridges the oil receiving space 111. The circulating pump 130 is fitted in the bypass pipe 131. Here, the oil quantity of the autonomous oil circuit is greater than the volume of the oil receiving space 111. Owing to the greater oil quantity and the circulation of the damping fluid, here too, an extended operation interval with defined damping properties is guaranteed.

The present invention has been disclosed with the help of a detailed description of different exemplary embodiments. It is, however, not limited hereupon but comprises all embodiments defined in the accompanying claims.

LIST OF REFERENCE NUMERALS

1 Housing
2 Ring-shaped chamber
3 Housing base body
4 Flange section
5 Housing cover
6 Vibration ring
7 Axial end face of the vibration ring 6
8 Axial inner wall of chamber 2
9 Outer periphery of the vibration ring 6
10 Inner periphery of chamber 2
11 Gap-shaped oil receiving space
12a Gap
12b Gap
13 Inner periphery of the vibration ring 6
14 Storage chamber
15 Inner ring
17 Overflow channel
18 Throttle opening
19 Oil collecting channel
20 Outer ring
21 Inflow channel
22 Outflow channel
23 Sealing stopper
24 Sealing stopper
25 Crosspiece
26 Valve
27 Filtration device
101 Housing
102 Ring-shaped chamber
103 Housing base body
104 Flange section
105 Housing cover
106 Vibration ring
107 Axial end face of the vibration ring
108 Axial inner wall of the ring-shaped chamber
109 Outer periphery of the vibration ring
111 Gap-shaped oil receiving space
112a Gap
112b Gap
114 Storage chamber
116a Bearing ring
116b Bearing ring
117 Overflow channel
118 Throttle opening
119 Oil collecting channel
128 Collection tank
129 Storage tank
130 Circulation pump
131 Bypass-pipe
132 Level indication

We claim:

1. Torsional vibration damper, comprising:
a housing having a fluid-tight ring-shaped chamber;
a storage chamber for storing fresh damping fluid;
an oil collection chamber distinct from the storage chamber for collecting worn damping fluid; and
a vibration ring rotatably supported in the ring-shaped chamber of the housing;
wherein an oil receiving space is formed between the vibration ring and the housing, said oil receiving space being gap-shaped and filled with a viscous damping fluid, wherein the oil receiving space has an oil inflow for receiving fresh damping fluid from the storage chamber and an oil outflow for transmitting worn damping fluid to the collection chamber, the oil outflow communicating with a section of the oil receiving space that is located radially further outside than the oil inflow, to control the replacement of the damping fluid present in the oil receiving space, and wherein damping fluid transmitted to the collection chamber is replaced with damping fluid received from the storage chamber, and wherein one or more throttle openings are arranged in the oil outflow, which communicate with the oil receiving space so that fresh damping fluid in the storage chamber is provided gradually to the oil receiving space and the oil collection chamber is gradually filled with worn damping fluid over a maintenance interval by a unidirectional flow of damping fluid from the oil receiving space to the oil collection chamber during rotation of the vibration damper by a unidirectional flow of damping fluid from the oil receiving space to the oil collection chamber during rotation of the vibration damper.

2. Torsional vibration damper according to claim 1, wherein the one or more throttle openings are connected to a zone of the oil receiving space, which is located radially outside the outer periphery of the vibration ring.

3. Torsional vibration damper according to claim 1, wherein the one or more throttle openings have a pressure-dependent valve function, wherein the one or more throttle openings do not open until a predetermined pressure level is reached, but remain closed below that level.

4. Torsional vibration damper according to claim 3, wherein the pressure level is above the maximum operating pressure and a storage chamber or the oil receiving space have a closable inflow opening.

5. Torsional vibration damper according to claim 1, wherein the one or more throttle openings have a temperature-dependent valve function, wherein the one or more throttle openings do not open until a predetermined temperature level is reached, but remain closed below that level.

6. Torsional vibration damper according to claim 1, wherein the one or more throttle openings have a rotational speed-dependent valve function, wherein the one or more throttle openings do not open until a predetermined rotational speed is reached, but remain closed below that speed.

7. Torsional vibration damper according to claim 1, wherein the one or more throttle openings have a time-dependent valve function, wherein the one or more throttle openings do not open until a predetermined operation duration is reached.

8. Torsional vibration damper according to claim 1, wherein a closing device is provided, which can be controlled from outside the damper for opening and closing the one or more throttle openings.

9. Torsional vibration damper according to claim 1, wherein the one or more throttle openings are formed by a filtration device, which is permeable for fluids up to a defined viscosity limit.

10. Torsional vibration damper according to claim 1, wherein the oil collection chamber has a smaller or at the most approximately the same volume as the storage chamber.

11. Torsional vibration damper according to claim 1, wherein the oil collection chamber is formed radially outside the ring-shaped chamber in the housing and is separated from the ring-shaped chamber by a crosspiece, and in that the one or more throttle openings, which connect the oil collection chamber with the ring-shaped chamber are arranged in the crosspiece.

12. Torsional vibration damper according to claim 1, wherein the oil collection chamber is separated by an insert from the ring-shaped chamber, and in that the one or more throttle openings joining the oil collection chamber with the ring-shaped chamber, are located in the insert.

13. Torsional vibration damper according to claim 1, wherein the oil collection chamber is formed on a collection tank which is externally fastened to the housing and is connected through the one or more throttle openings with the oil receiving space in the ring-shaped chamber.

14. Torsional vibration damper according to claim 1, wherein the oil collection chamber is located in the vibration ring.

15. Torsional vibration damper according to claim 1, wherein the oil collection chamber is provided with a level indication or a level sensing system.

16. Torsional vibration damper according to claim 1, wherein the storage chamber radially inward borders on the ring-shaped chamber.

17. Torsional vibration damper according to claim 1, wherein the storage chamber is formed in a storage tank which is fastened on the outside of the housing and in that is connected with the oil receiving space by a channel extending through the housing.

18. Torsional vibration damper according to claim 1, wherein the storage chamber is located in the vibration ring.

19. Torsional vibration damper according to claim 1, wherein the oil outflow and the oil inflow of the oil receiving space are connected to one another by a bypass pipe that bridges the oil receiving space and in that a circulating pump is located in the bypass pipe.

* * * * *